United States Patent Office 2,923,971
Patented Feb. 9, 1960

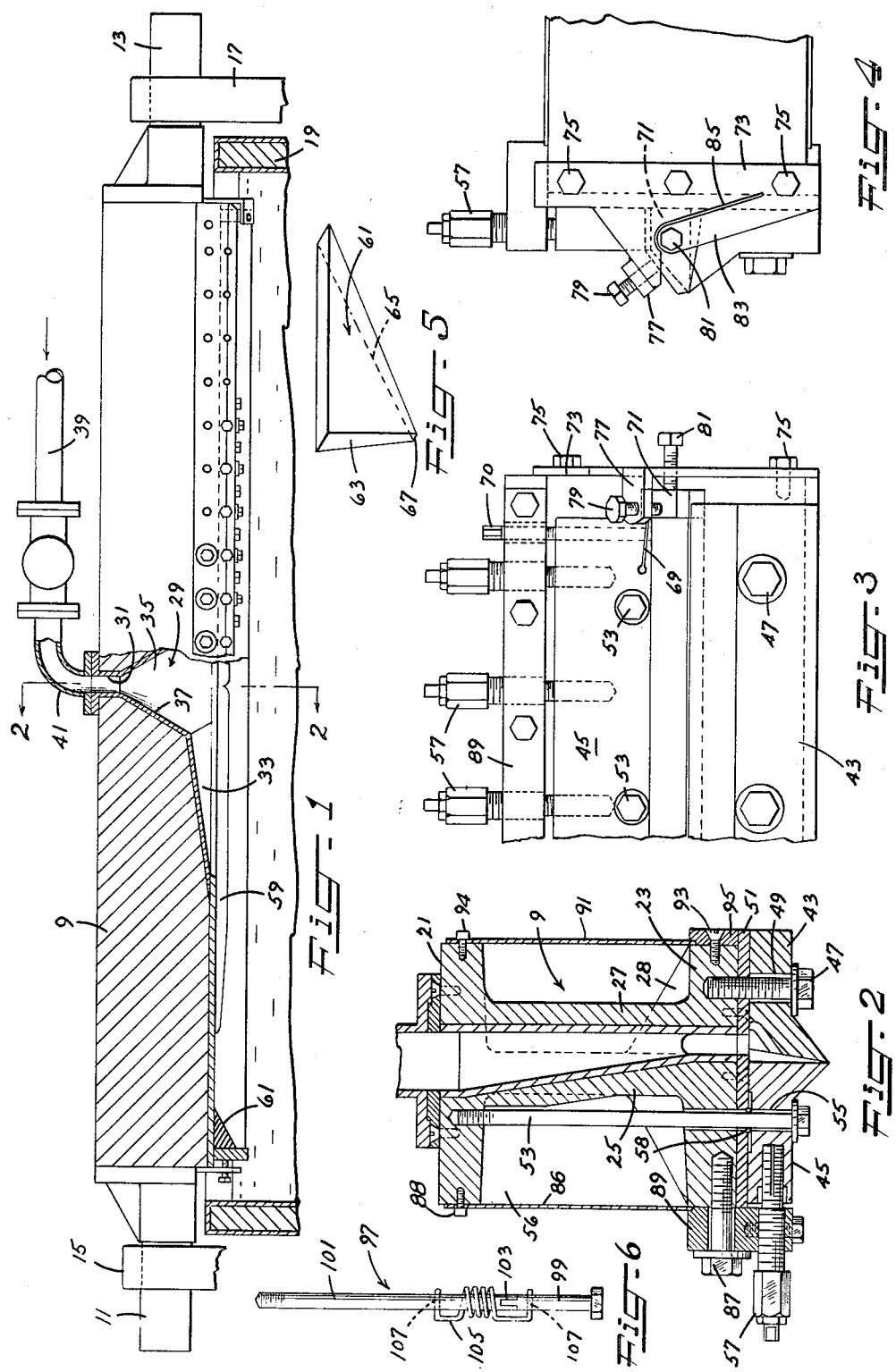

2,923,971

EXTRUSION NOZZLE

Seddon C. Nelson, Fredericksburg, Va., assignor to American Viscose Corporation, Philadelphia, Pa., a corporation of Delaware Application October 12, 1956, Serial No. 615,707

11 Claims. (Cl. 18—12)

The invention relates to apparatus for the manufacture of non-fibrous foils, pellicles, films, sheets, and like products from film-forming compositions, and more particularly is directed to an improved extrusion nozzle having means for more conveniently and accurately controlling the thickness of the extruded film along its entire width.

In the extrusion of a thin film or sheet, one of the most serious problems encountered is that of providing the film or sheet with a uniform thickness across its entire width, and particularly in the area adjacent the sheet edges, while still minimizing the seepage of film-forming material between the various parts. While the adjustable extrusion device described in my United States Patent 2,727,276 facilitates accurate adjustment of the width of the extrusion orifice, the construction of the nozzle there disclosed permits some seepage of the film-forming material between the adjustable blade or lip member and the main body of the nozzle, and in addition, prevents the adjusted relationship of the parts to be maintained as dimensional changes, due for example to temperature variations, are occasioned. Further advancements in overcoming the above noted difficulties have been disclosed in my United States Patents 2,712,155 and 2,727,275, directed to an improved nozzle blade and an extrusion orifice end block arrangement, respectively. While the end block arrangement effectively minimizes seepage of the film-forming material at the ends of the extrusion orifice, this feature has failed to overcome entirely the friction effects which interfere to some degree with the thickness control function of the improved nozzle blade. Therefore, it is a primary object of the present invention to provide a generally improved and more satisfactory extrusion nozzle for use in the production of films and sheets.

Another object is the provision of an improved film extrusion apparatus free of stagnant fluid film areas, and having means for conveniently and accurately controlling the thickness of the extruded film along its entire width.

Still another object is to provide an extrusion apparatus in which seepage of film-forming material between the various parts is eliminated or minimized.

A further object is the provision of an extrusion nozzle having means which compensate for dimensional changes of the nozzle yet maintain the various parts in desired adjusted positions without in any manner interfering with accurate response to adjustment.

These and other objects and advantages of the invention will be apparent from the following description and accompanying drawing in which:

Figure 1 is a front view of the extrusion apparatus of the present invention disposed in its operative position within a coagulating container and with portions thereof being broken away to illustrate the interior construction;

Figure 2 is a transverse vertical section taken along the line 2—2 of Figure 1;

Figure 3 is a bottom view of a portion of the structure shown in Figure 1;

Figure 4 is a side view of a portion of the structure shown in Figure 3;

Figure 5 is a perspective view of one of the elements of the improved extrusion apparatus; and Figure 6 is a view illustrating a modified bolt arrangement for supporting the nozzle movable blade.

Generally, the invention relates to an extrusion nozzle free of stagnant flow areas and which includes an improved main body or casting movably carrying at least one of the orifice forming blades or lip members as to allow the same to be more easily adjusted and maintained in adjusted position, and with little or no seepage of film-forming material between the parts being occasioned. To minimize fluid seepage at the areas adjacent to the end portions of the nozzle blades or lip members, extrusion end blocks are provided, with each being resiliently mounted to permit free and accurate adjustment of the extrusion orifice.

Referring now more particularly to Figures 1 and 2 of the drawing, the nozzle of the present invention includes a body or main casting 9 having trunnions 11 and 13 projecting outwardly from its ends and rotatably mounted within suitable bearings, such as shown at 15 and 17, fixed on opposite sides of a container 19. Preferably, the trunnions 11 and 13 are disposed only slightly above the longitudinal centerline of the main casting 9 so as to enable the nozzle to be more easily moved between its operative and inoperative positions. The casting 9, as best seen in Figure 2, is of generally I-shaped construction and includes flanges 21 and 23 connected by a web 25, the latter having a thickened central area as shown at 27. Longitudinally spaced web stiffeners 28 are preferably provided for the sake of rigidity. Centrally of the casting 9, there is provided a feed passage 29 which includes a circular inlet opening 31 passing through the uppermost flange 21, an elongated tapered groove 33 formed in the lowermost flange 23 and extending longitudinally thereof, and an intermediate slot 35 which gradually tapers to a reduced width and an increased length as it approaches the groove 33. Preferably, the feed passage 29 is lined with a corrosive resistant material 37, such as stainless steel. Delivery of the film-forming or spinning material is accomplished by a feed hose 39 leading from a suitable supply source, not shown, and connected at its opposite end to the inlet opening 31 by means of an elbow 41.

Carried on the underside of the main casting 9 are adjustable blades or lip members 43 and 45 which together determine the ultimate width of the extrusion orifice. The blade 43 is fastened to the lower flange 23 of the main casting by a plurality of cap screws 47 which extend upwardly through a plurality of slots 49 in the lip member, through a bearing or bottom plate 51, and threadingly engage the underside of the main casting. The slots 49 permit a lateral sliding movement of the lip member on the cap screws and therefore facilitate a preliminary relatively coarse sliding adjustment of the width of the extrusion orifice. The lip member 45 is fastened to the main casting 9 by a plurality of elongated bolts 53 which extend upwardly through a plurality of slots 55 in the lip member, through the bearing plate 51 and the lowermost flange 23, and threadingly engage the underside of the casting uppermost flange 21. Thus, the lip member 45 is similarly slidably adjustable on its respective bolts 53 and may be accurately controlled by means of adjusting screws 57, which correspond both in function and structure to the screws 40 more fully described in my United States Patent 2,727,276. To eliminate seepage from the space between the blade 45 and bearing plate 51 and into an internal cavity noted at 56, an O-ring 58 is disposed about each of the bolts 53 as shown in Figure 2.

As with the structure described in my United States Patent 2,727,276, the orifice-defining surfaces of the opposed blades 43 and 45 have been specially designed to facilitate the sliding movement and the desired degree of adjustability of the slidable blade 45 along the bearing plate 51. Thus, in the present invention the entire spinning solution contacting surface of the blade 45 extends downwardly in a vertical manner and in this way no vertical pressure component of the downwardly flowing spinning solution is exerted on the blade 45, and a sliding adjustment thereof along the bottom plate 51 may be more easily effected. An additional feature of the present apparatus resides in the distributing trough 59 machined into the face of the blade 43. With this arrangement, the spinning solution is delivered into the triangular shaped areas beyond the ends of the trough 59 at an increased velocity not heretofore possible with known nozzle constructions, and thus assists in minimizing any tendency for stagnant flow areas to develop. It will also be noted that the trough 59 has no internal corners and is completely exposed thus facilitating thorough cleaning and inexpensive fabrication.

The bolts 53 are preferably located on or adjacent to the center gravity of the blade 45 to minimize any binding tendency during blade adjustment, and are spaced at rather close intervals to distribute the load over a greater number of bolts and to provide a more uniform pressure between the blade 45 and the bottom plate 51. In comparison with the cap screws normally employed in the nozzle constructions heretofore disclosed, the bolts 53 of the present apparatus, being of greater length and of reduced diameter, may be more easily flexed to permit final minute adjustments of the blade 45 without the presence of sliding friction between the blade and the head of each of the bolts 53. More important, the bolts 53, here employed, exhibit greater resilience in a longitudinal direction. Thus, when the blade 45 is fastened in place, the bolts 53 are more adapted to be stretched or pretensioned to a greater degree than in previous structures so that the blade 45 is elastically held snugly up against the bottom plate 51. As the nozzle is subjected to dimensional changes, due for example to temperature variations or displacement of lubricant from the area between the contacting surfaces of the blade 45 and plate 51, the bolts 53 adjust themselves by tending to return to their normal untensioned condition and thus compensate for the dimensional changes, yet maintain the blade in adjusted position snugly up against the bottom plate 51. This aspect of the present invention not only reduces the possibility of fluid seepage between the blade 45 and the bottom plate 51, but permits the apparatus to be operated for longer periods of time before the bolts 53 must again be tightened.

To further insure against stagnant flow areas at the outermost ends of the nozzle, pyramid-shaped inserts or fillets 61, preferably formed of gum rubber, are positioned, as shown in Figure 1, within the triangular spaces formed by the end portions of the blades 43 and 45 and the bottom plate 51. Since the blades 43 and 45 are most closely spaced at their end portions the inserts 61 are each shaped as shown at Figure 5, with the sides 63 and 65 gradually tapering to provide its lowermost corner 67 with a reduced thickness. Thus, the particular configuration and the resiliency of the inserts 61 both contribute to enable the blades to be adjusted without any interference.

As seen in Figure 3, the blade 45 is provided with shaped kerfs 69 which permit the end portions of the blade to be each bent or bowed along a precalculated neutral axis, as adjusting screws 70 are turned, to modify the shape of the extrusion slot. As more fully described in my United States Patent 2,712,155, this construction enables the shape of the ends of the extrusion slot to be carefully controlled. In addition, a pair of end blocks 71, corresponding in both function and structure to the blocks 32 described in my United States Patent 2,727,275, are engaged against the extremities of the blades 43 and 45 to minimize fluid seepage at these areas. Plates or brackets 73 for supporting the end blocks 71 in position are each secured to the ends of the main casting 9 by cap screws 75 and extend downwardly therefrom. As in the patented structure, last noted above, a plate 77 is welded or otherwise secured to each of the brackets 73 and threadingly receives an adjusting or clamping screw 79. In the apparatus of the present invention, however, the second adjusting or clamping screws 81, which correspond to the screws 30 described in my United States Patent 2,727,275, pass through the outermost ends of resilient fingers 83 which are formed by cutting the respective brackets along the lines shown at 85. With this modified bracket assembly, a uniform pressure is exerted against each of the end blocks 71 to maintain the same in engagement with the ends of the blades and the bottom plate, and thus prevents fluid seepage at these areas. More important however, the resilient fingers 83 enable the brackets 73 to provide a uniform pressure on the end block 71 without in any manner interfering with blade adjustment. Thus at all times there is a minimum tendency for the edges of the blade 45 to frictionally bind against the end blocks and remain in stationary position while the kerfs are merely spread open as the screws 70 are turned.

To protect the main casting 9, and in addition to providing internal insulating air space, a front cover plate 86 is secured to the casting by screws 87 and 88 and the adjusting bar 89, while a similar rear cover plate 91 is fastened to the casting by screws 93 and 94 and a cover strip 95.

With reference to Figure 6 of the drawing, there is illustrated a modified bolt arrangement which may be employed in lieu of or in combination with the bolts 53 for maintaining the blade 45 snugly up against the bearing plate 51. As shown, modified bolts 97 are each formed of a pair of sections 99 and 101 which are interconnected for axial sliding and unitary rotary movement by a tongue and groove joint shown at 103. Encircling each of the bolts 97 is a coiled spring 105 which, in its operative position as hereinafter described, has its terminal portions fixed to the bolt sections 99 and 101 while being stretched to a desired degree. For ease in assembly, openings 107 are provided in the sections 99 and 101 for reception of the spring ends, as shown in Figure 6.

In use, the bolts 97 are passed upwardly through the aligned openings in the blade 45, the bearing plate 51, and the lowermost casting flange 23. As the threaded ends of the bolts 97 are extended above the upper surface of the flange 23, the springs 105 are applied over the projecting ends thereof, after which the bolts are threaded into the casting flange 21 until the bolt heads engage with the blade 45. The ends of the springs 105 are then inserted into the openings 107 in the sections 99 and 101 of the respective bolts 97 and additional advancement of the bolts is effected. Since axial movement of the bolt sections 99 is restrained by the blade 45, this continued turning of the bolts 97 to advance the same causes the bolt sections 101 to move axially away from the respective sections 99 thereby stretching the springs 105. The springs 105, in their stretched condition, thus exert a tensile force on the bolt sections 99 which initially urges the blade 45 snugly up against the bearing plate 51 and in addition permits the parts to maintain their same relative positions by compensating for the dimensional changes to which the nozzle may be subjected.

With the modified arrangement, the bolts 97 may be advanced to any desired degree, providing the sliding tongue and groove connection between the bolt sections 99 and 101 is at all times maintained, and thus accurate control of the tensile force on each of the bolts 97 can be had by correlating the same with the number of bolt advancing turns. Furthermore, the elongated nature of the bolts 97 permit the same to be easily flexed during final minute adjustments without introducing any stresses on the other nozzle parts.

It will be noted that the apparatus here presented is of simple and lightweight construction and can be thus fabricated, assembled, cleaned, and operated more rapidly and with greater ease than the nozzle structures heretofore disclosed. Further, with the nozzle here described stagnant flow areas are eliminated, fluid seepage is minimized, and a more accurate adjustment of the parts is attained without in any manner sacrificing the efficiency of the nozzle operation.

It is seen from the above description that the objects of the invention are well fulfilled by the structure described. The description is intended to be illustrative only and it is to be understood that changes and variations may be made without departing from the spirit and scope of the invention as defined by the appended claims.

I claim:

1. Film extrusion apparatus including a main body having a planar exterior surface, a fluid feed passage formed approximately centrally of said body and having an elongated opening passing through said planar exterior surface, a pair of lip members of unequal length disposed on opposite sides of said elongated opening and together forming an extrusion orifice, the longer one of said lip members being stationary and the other of said lip members being mounted for sliding movement along said planar exterior surface, means for slidably adjusting said last-mentioned lip member for varying the size of the extrusion orifice, a pair of end blocks, and brackets for maintaining said end blocks in desired position, said brackets each including rigid means for urging an adjacent end block against the projecting portion of the longer of said lip members and a resilient portion for yieldably holding said adjacent end block against the end of the shorter of said lip members to prevent fluid seepage thereat.

2. Film extrusion apparatus including a main body having a planar exterior surface, a fluid feed passage formed approximately centrally of said body and having an elongated opening passing through said planar exterior surface, a pair of lip members of unequal length disposed on opposite sides of said elongated opening and together forming an extrusion orifice, walls defining kerfs at the ends of the shorter of said lip members, means for flexing a portion of each end of said last-mentioned lip member on one side of said kerfs with respect to the other of said lip members to vary the spacing between the end portions of said lip members, a pair of end blocks, and brackets for maintaining said end blocks in desired position, said brackets each including rigid means for urging an adjacent end block against the projecting portion of the longer of said lip members and a resilient portion for yieldably holding said adjacent end block against the end of the shorter of said lip members to prevent fluid seepage thereat while permitting unrestricted flexing of the lip member having said kerfs.

3. Apparatus as defined in claim 1 wherein said means for mounting said movable lip member includes a plurality of elongated bolts threadedly connected to said body and being unrestrained laterally for a substantial portion of their length to permit flexing of the same, said elongated bolts each including a pair of interconnected sections, and resilient means fixed to said bolt sections and exerting a tensile force thereon.

4. Apparatus as defined in claim 1 wherein said main body includes a unitary elongated structure of I-shaped configuration having a pair of flanges and a web formed with a thickened central area, and wherein said planar exterior surface is formed on one of said main body flanges.

5. Apparatus as defined in claim 1 wherein the resilient portion of each of said brackets is a resilient finger, with and adjusting screw passing through said resilient finger and bearing against said end block.

6. Apparatus as defined in claim 1 further including inserts disposed between the terminal portions of said lip members and said planar surface of the main body, said inserts each having a surface for directing the fluid toward the extrusion orifice and preventing stagnant flow areas.

7. Apparatus as defined in claim 1 wherein the shorter one of said lip members is mounted for movement along said planar surface by a plurality of elongated bolts threadedly conected to said body and being unrestricted laterally for a substantial portion of their length to permit flexing of the same, and further including means for slidingly adjusting said movable lip member to vary the size of said extrusion orifice.

8. Apparatus as defined in claim 7 wherein said elongated bolts are each formed of a pair of interconnected sections, and further including resilient means fixed to said bolt sections and exerting a tensile force thereon.

9. Apparatus as defined in claim 2 wherein said resilient portion of each of said brackets is a resilient finger, with an adjusting screw passing through said resilient finger and bearing against said adjacent end block.

10. Film extrusion apparatus including an elongated unitary main body of I-shaped configuration having a pair of flanges and a web with a thickened central area, a fluid feed passage extending through said main body and including a substantially circular entrance opening at the surface of one of said flanges, an elongated exit opening at the surface of the other of said flanges, and an intermediate section extending through the thickened central area of said main body web and gradually decreasing in width and increasing in length as it approaches said exit, said feed passage adapted to discharge a fluid material at substantially the same velocity along the entire length of said elongated exit, a pair of adjustable lip members disposed on opposite sides of said feed passage exit with the opposing surfaces of said lip members defining an extrusion orifice, one of said opposing surfaces being substantially parallel to the axis of said fluid feed passage, the other of said opposing surfaces being channeled longitudinally thereof adjacent to said exit for directing fluid laterally toward the ends of said extrusion orifice at a substantial velocity and inserts disposed between the end portions of said lip members and said main body for directing fluid toward said extrusion orifice as it leaves the channeled portion of the other of said opposing surfaces, said inserts being made of resilient material to permit the same to be compressed between said lip members during adjustment thereof and having tapered sides to provide the same with reduced sections adjacent the outer ends of said lip members.

11. Apparatus as defined in claim 10 further including a plurality of elongated bolts passing through enlarged openings in one of said lip members and the body flange adjacent thereto and being threadedly connected to the other of said body flanges, said elongated bolts each being formed of a pair of bolt sections interconnected by resilient means which exerts a tensile force thereon.

References Cited in the file of this patent

UNITED STATES PATENTS

| | | |
|---|---|---|
| 2,387,718 | Coleman | Oct. 30, 1945 |
| 2,514,211 | Carlson | July 4, 1950 |
| 2,712,155 | Nelson | July 5, 1955 |
| 2,718,661 | Russell | Sept. 27, 1955 |
| 2,727,275 | Nelson | Dec. 20, 1955 |
| 2,727,276 | Nelson | Dec. 20, 1955 |

FOREIGN PATENTS

| | | |
|---|---|---|
| 379,789 | Great Britain | Sept. 8, 1932 |